United States Patent
Tatar et al.

(10) Patent No.: US 6,825,634 B2
(45) Date of Patent: Nov. 30, 2004

(54) SYSTEM AND METHOD FOR A SCALABLE MOTION CONTROLLER FOR CONTROLLING A PLURALITY OF SERVO MOTORS

(75) Inventors: Christopher J. Tatar, Endicott, NY (US); Michael D. Senger, Endicott, NY (US); Robert V. Rycroft, Owasso, OK (US)

(73) Assignee: Lockeed Martin Corporation, Bethesda, MD (US)

( * ) Notice: Subject to any disclaimer, the term of this patent is extended or adjusted under 35 U.S.C. 154(b) by 0 days.

(21) Appl. No.: 10/054,024

(22) Filed: Jan. 18, 2002

(65) Prior Publication Data

US 2002/0125849 A1 Sep. 12, 2002

Related U.S. Application Data

(60) Provisional application No. 60/262,600, filed on Jan. 18, 2001.

(51) Int. Cl.[7] .............................................. G05B 11/32
(52) U.S. Cl. .................. 318/625; 318/34; 318/567; 318/569; 318/600; 361/600; 361/728; 361/748; 361/785; 439/74; 439/66; 439/591; 439/75; 439/710
(58) Field of Search .......................... 318/34, 625, 567, 318/568.11, 569, 600; 361/600, 728, 748, 785; 439/74, 66, 591, 75, 710

(56) References Cited

U.S. PATENT DOCUMENTS

| | | | | |
|---|---|---|---|---|
| 3,989,331 A | | 11/1976 | Hanlon | 339/17 CF |
| 4,558,914 A | * | 12/1985 | Prager et al. | 339/75 R |
| 4,560,218 A | | 12/1985 | Billman et al. | 339/17 CF |
| 4,936,784 A | | 6/1990 | Saito | 439/72 |
| 5,339,014 A | * | 8/1994 | Nesper | 318/563 |
| 5,473,766 A | | 12/1995 | Shaver | 395/500 |
| 5,619,111 A | * | 4/1997 | Katagiri et al. | 318/625 |
| 5,621,292 A | * | 4/1997 | Kokura et al. | 318/599 |
| 5,742,143 A | * | 4/1998 | Katagiri | 318/625 |
| 5,781,921 A | | 7/1998 | Nichols | 395/430 |
| 5,862,351 A | | 1/1999 | He | 395/284 |
| 6,091,219 A | * | 7/2000 | Maruo et al. | 318/562 |
| 6,188,190 B1 | * | 2/2001 | Arakawa | 318/560 |
| 6,188,194 B1 | * | 2/2001 | Watanabe et al. | 318/625 |
| 6,297,612 B1 | * | 10/2001 | Shloush et al. | 318/569 |
| 6,384,561 B1 | * | 5/2002 | Niizuma et al. | 318/625 |
| 6,431,879 B2 | * | 8/2002 | Brekosky et al. | 439/74 |
| 6,522,096 B1 | * | 2/2003 | Roth | 318/568.1 |

OTHER PUBLICATIONS

Microcomputer Systems, Inc., Data Sheet for the MSI–P900 I/O Prototyping Card.

* cited by examiner

*Primary Examiner*—Rina Duda
(74) *Attorney, Agent, or Firm*—Finnegan, Henderson, Farabow, Garrett & Dunner, L.L.P.

(57) ABSTRACT

A motion control system comprises a motion unit having a motor connected to an encoder and an amplifier. The motion control system further comprises a scalable motion controller connected to the motion unit wherein the scalable motion controller receives signals from the encoder and outputs signals to the amplifier. The scalable motion controller comprises a plurality of dip sockets arranged for inserting and removing one or more motion control processors and a connector interface comprising a plurality of male and female connectors arranged for stacking a plurality of motion controllers.

15 Claims, 6 Drawing Sheets

SYSTEM AND METHOD FOR A SCALABLE MOTION CONTROLLER FOR CONTROLLING A PLURALITY OF SERVO MOTORS

CROSS-REFERENCE TO RELATED APPLICATION

This application claims the priority benefit of U.S. Provisional Application No. 60/262,600, filed on Jan. 18, 2001, which is incorporated herein by reference.

DESCRIPTION OF THE INVENTION

1. Field of the Invention

The present invention relates in general to servo control systems, and more particularly, to a scaleable motion controller that can control multiple servo motors in a motion control system.

2. Background of the Invention

Motion control systems are used in applications such as robotics and material handling. A single axis motion control system typically comprises a motor, an encoder, an amplifier, and a motion controller. In general, motion is controlled by providing signals representing the position of the motor shaft to the motion controller via the encoder. Based on the actual position of the motor shaft and the desired position of the motor shaft, the motion controller outputs signals to the motor via the amplifier driving the motor to the desired position.

An n-axis motion control system comprises n motors with corresponding encoders and amplifiers. A single motion controller may be used for motion control in an n-axis motion control system if the motion controller has at least n processors, one for each motor. In general, motion is controlled in an n-axis motion control system by providing signals representing the positions of the motor shafts of each of the n motors to the motion controller via the respective n encoders. Based on the actual positions of the motor shafts of the n motors and the desired position of the motor shafts of the n motors, the motion controller outputs signals to the n motors via the n amplifiers, respectively. If the number of processors needed exceeds the number of processors that can fit on a single motion controller, then additional motion controllers will be needed.

Traditional motion controllers comprise a fixed number of processors. That is, these motion controllers are not designed to allow a user to purchase only the number of processors needed for a particular project. For example, for a 2-axis motion control system where only two processors are needed, a user must purchase a motion controller having four processors fixed to the motion controller even though the user needs only two of the processors does not need the remaining two processors fixed to the motion controller. Because motion controller must be purchased with a predetermined number of processor fixed to the motion controller, a user must pay for more processors than need. This makes motion controller very costly.

Accordingly, there is a need for a scalable motion controller where a user may select the number of processors needed for a particular application and use only the number of processors required on the motion controller.

SUMMARY OF THE INVENTION

In accordance with the invention, there is provided a scalable motion controller for controlling a plurality of servo motors in a motion control system. The scalable motion controller comprises means for inserting and removing one or more motion control processors and means for stacking a plurality of scalable motion controllers.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
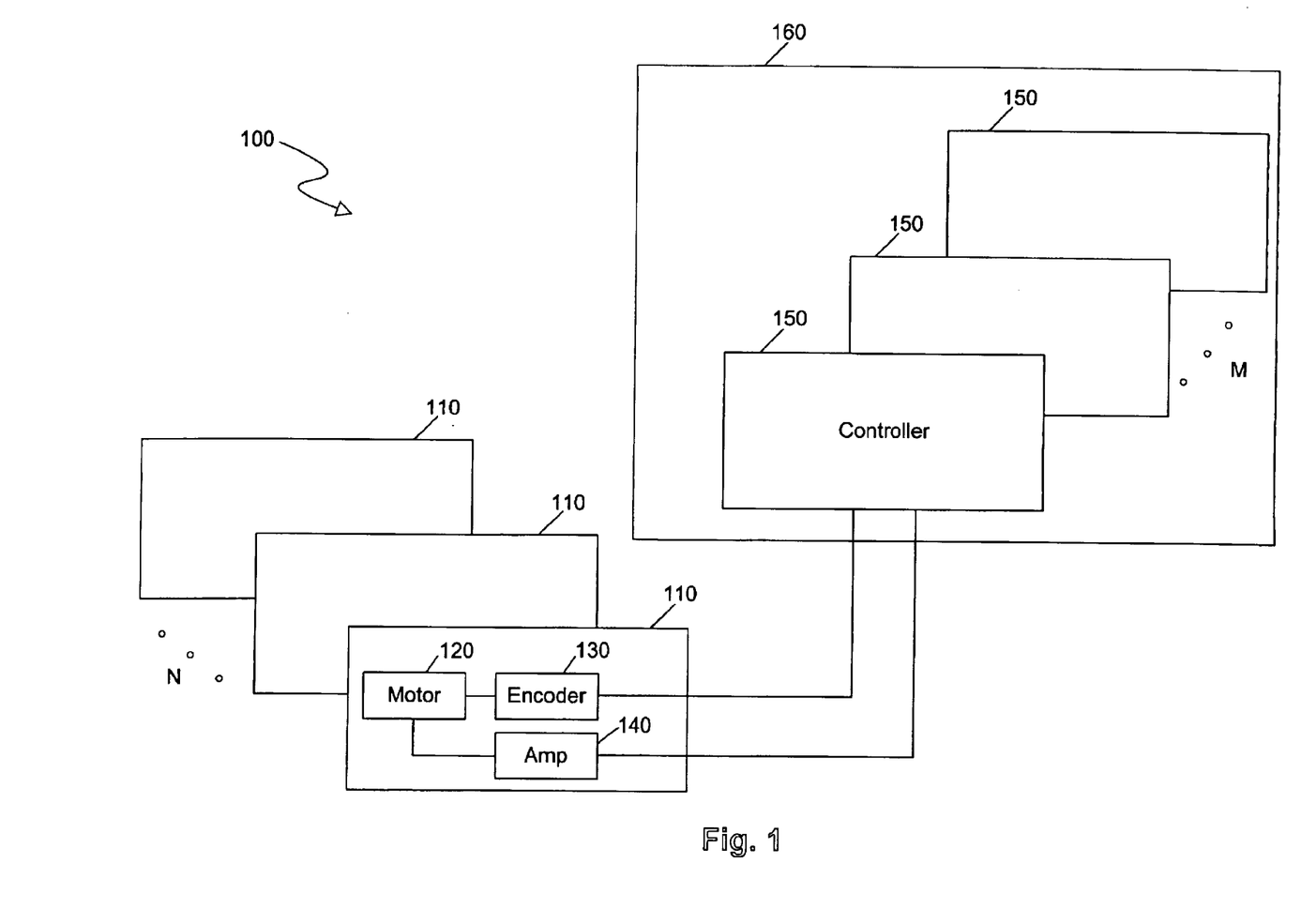
FIG. 1 illustrates an exemplary motion control system.

FIG. 1 illustrates an exemplary motion control system 100 comprising N motion units 110, where N may be any number greater than or equal to one. Each motion unit 110 may assist in providing motion to a part of a system or apparatus, such as a robotic device, for example. Each motion unit 110 comprises a motor 120, an encoder 130, and an amplifier 140. The motion control system 100 further comprises M controllers 150, where M may be any number greater than or equal to one. Each controller 150 comprises a user selectable number of motion control processors, NP. Accordingly, the i-th controller 150 may comprise a user selectable $NP_i$, i=1, 2, ... M, of motion control processors. The total number of motion control processors, $$T = \sum_{i=1}^{M} NP_i,$$

may equal the number, N, of motion units 110.

Still further, the motion control system 100 comprises a host computer 160. The host computer 160 generally interfaces with the motion control processors via controller interfaces of the motion control processors Each motion unit 110 provides signals representing the motor shaft position of the corresponding motor 120 to a corresponding motion control processor of the M controllers 150. Based on the actual motor shaft position of a motor 120 and the desired motor shaft position of the motor 120 and signals from the host computer 160, the corresponding motion control processor outputs signals to the motor 120 via the corresponding amplifier 140 driving the motor shaft of the motor 120 to the desired position. A description of an exemplary operation of a motion control system is disclosed in a datasheet published by National Semiconductor in November 1999 entitled, "LM628/LM629 Precision Motion Controller," which is herein incorporated by reference and which may be disclosed on the Internet at URL:http://www.national.com/pf/LM/LM628.html.

Figure 2:
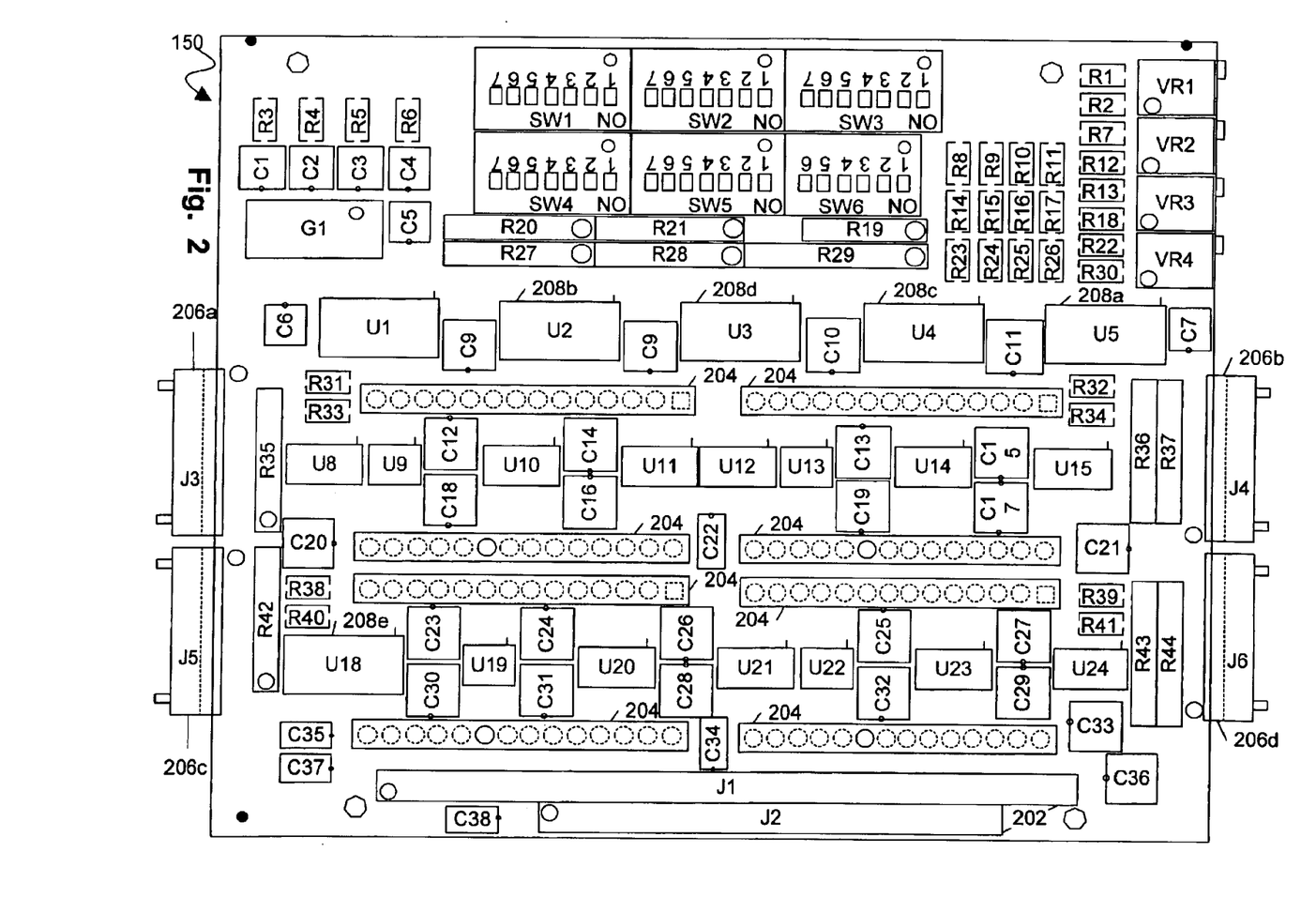
FIG. 2 illustrates an embodiment of a controller according to the present invention.

FIG. 2 illustrates an exemplary embodiment of the controller 150 according to the present invention. Each controller 150 comprises a controller interface 202, dip sockets 204, I/O devices 206a–d, programmable logic devices 208a–e, and switches SW1–6. The controller 150 may also comprise other components such as resistors R1–R44, capacitors C1–38, and potentiometers VR1–VR4. The potentiometers VR1–VR4 may be used for fine tuning the controller 150 by connecting the potentiometers to corresponding inputs of operational amplifiers U9, U13, U19, and U22, for example. Capacitors C5, C6, C7, C8, C9, C30, C33, C34, C35, C36, C37 may be connected in parallel between VCC and ground. Capacitors C16, C17, C18, C19, C28, C29, C31, and C32, may be connected in parallel between +12V, for example, and ground. Capacitors C12, C13, C23, C24, C25, and C38 may be connected between −12V, for example, and ground. Capacitors U14, C15, C26, C27 may be connected between corresponding inputs of digital to analog converters U10, U14, U20, U23 and ground. Capacitors C1 and C2 may be used in connection with dual monolithic multivibrators U21. Capacitors C3 and C4 may be used in connection with dual monolithic multivibrators U12. Various one of the resistors may be connected between inputs or outputs of the components of the controller 150 and VCC, ground, or +12V, for example, or may be used in the design of the operation amplifiers U9, U13, U19, and U22, for example.

Figure 3:
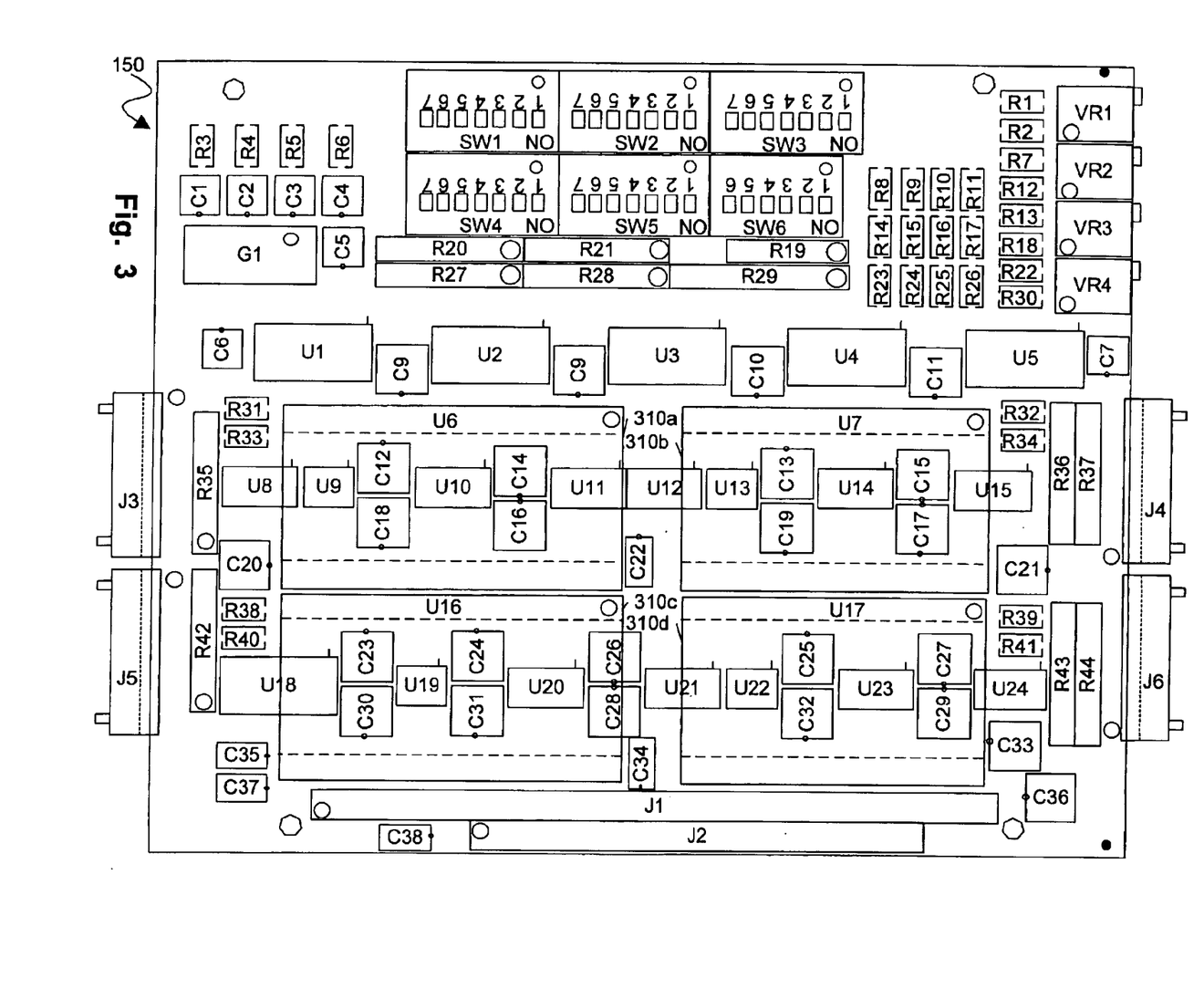
FIG. 3 illustrates the controller of FIG. 2 with exemplary motion control processors inserted in the dip sockets.

The dip sockets 204 are provided for inserting and removing motion control processors from the controller 150. In the embodiment of FIG. 2, the dip sockets 204 are arranged to receive up to four motion control processors. FIG. 3 illustrates the controller 150 with four motion control processors 310a–d inserted in the dip sockets 204. In other embodiments of the controller 150, the dip sockets may be arranged to receive more or less motion control processors. The dip sockets may be of any shape or size so long as it is capable of inserting and removing the motion control processors from the controller 150. For example, the dip socket may be designed to received processors having a quad flatpack (QFP) design or any other chip packaging design. In an alternate embodiment, other receptacles may be use in place of the dip sockets to receive the motion control processors. For example, any physical connector that is capable of connecting the motion control processors directly or indirectly to the controller 150 may be used in the place of the dip sockets.

In one embodiment, the motion control processors 310a–d correspond to the LM628 or LM629 motion control processors manufactured by National Semiconductor. However, other motion control processor may be used. It will be obvious to those of ordinary skills in the art how to alter the controller 150 to receive other motion control processors.

The controller 150 connects the controller interface 202, the programmable logic devices 208, and the motion control processors 310a–d. The controller interface 202 connects with the host computer 160 and receives signals from the host computer 160, which are provided to the programmable logic devices 208 and the motion control processors 310a–d. The controller interface 202 also receives signals from the programmable logic devices 208 and the motion control processors 310a–d, which are provided to the host computer 160.

In one embodiment, the controller interfaces 202 of the controllers 150 are capable of connecting to each other in a stacking manner, i.e., one on top of the other. Each controller interface 202 may comprise one or more female connectors on a component side of the controller 150 and one or more male connectors on a pin protrusion side of the controller 150. In this arrangement, a first controller 150 may connect with a second controller 150 on the component side of the first controller 150 by connecting the female connectors of the controller interface 202 of the first controller 150 with the male connectors of the controller interface 202 of the second controller. Further, in this arrangement, the first controller 150 may connect with a third controller 150 on the pin protrusion side of the first controller 150 by connecting the male connectors of the controller Interface 202 of the first controller 150 with the female connectors of the controller Interface 202 of the third controller 150. Accordingly, the controllers 150 may be connected by stacking one controller on top of another.

Alternatively, the controller interfaces 202 may comprise one or more male connectors on the component side of the controllers 150 and one or more female connectors on the pin protrusion side of the controllers 150. The controller interface 202 may be arranged according to the PC/104 form factor. The PC/104 specification, version 2.4, August 2001, is disclosed at the following URL: http:/www.pc104.org/technology/PDF/PC104Specv246.pdf, which is herein incorporated by reference.

More particularly, the controller interface 202 may comprise two buses J1 and J2 having a total of 104 signal contacts. Bus J1 may have 64 signal contacts and bus J2 may have 40 signal contacts. In one embodiment of the present invention, the entire controller 150 is PC/104 "Compliant." That is, the entire controller conforms to all non-optional aspects of the PC/104 specification, including both mechanical and electrical specifications. For example, the controller 150 has a form-factor of 3.550 by 3.775 inches (90 by 96 mm) and a 16 bit PC/AT bus implemented via "stack-through" bus connectors.

By providing dip sockets 204 for inserting and removing motion control processors, the controller 150 is scalable and may be adapted for any motion control system requiring any number of motion control processors. If the number of processors needed in a motion control system exceeds the number of motion control processors capable of being added to a single controller 150, one or more additional processors may be added to one or more additional controllers 150 that are connected together via the controller interfaces 202. For example, assume that the controller 150 may support up to four motion control processors and that a motion control system requires five motion control processors. Two controllers 150 may be stacked together with the first controller having four processors and the second controller having one processor. A user is not required to purchase two controllers having a total of eight processors fixed to the controllers (i.e., four processors fixed to each controller), for example. Therefore, there is significant cost savings in not having to purchase three motion control processors that are not going to be used.

Figure 4:
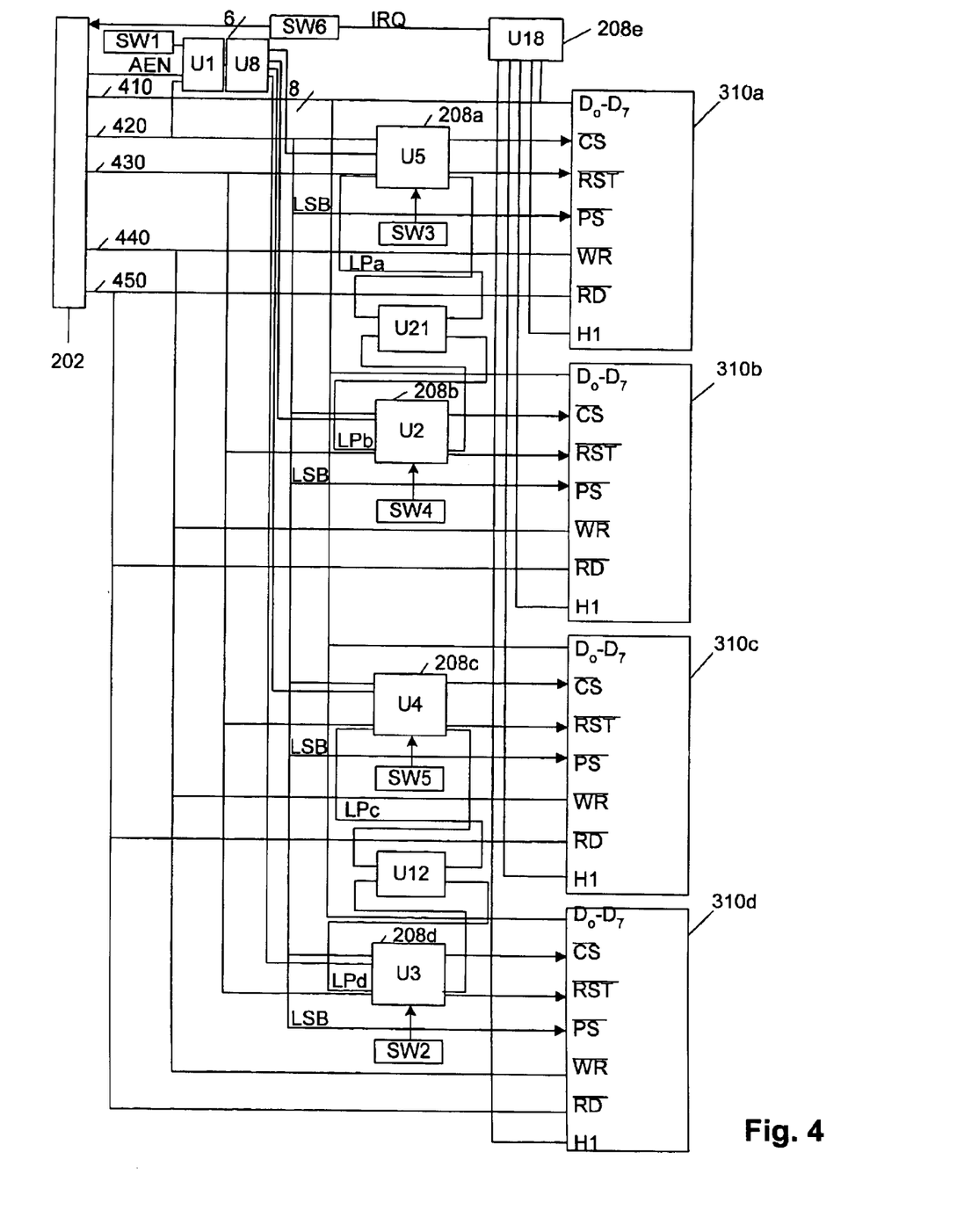
FIG. 4 illustrates an exemplary circuit diagram of a part of the controller of FIG. 2 including an exemplary controller interface, exemplary programmable logic devices, and exemplary motion control processors.

FIG. 4 illustrates an exemplary circuit diagram of the controller 150. The circuit diagram includes a part of the controller interface 202, the programmable logic devices 208a–e, and the motion control processors 310a–d. In this embodiment, the motion control processors 310a–d correspond to the LM628 motion control processors manufactured by National Semiconductor. However, changing the circuit diagram of FIG. 4 for other motion control processors will be obvious to those of ordinary skill in the art. As shown in FIG. 4, the data lines 410 of the controller interface 202 connect to the data port inputs (i.e., pins 4–11) of the LM628 motion control processors 310a–d. The data lines 410 of the controller interface 202 receive data and commands from the host processor 160 and transmit the data and commands to the data port inputs of each of the motion control processors 310a–d.

Further, the address lines 420 of the controller interface 202 connect to each of the programmable logic devices 208a–d. The address lines 420 receive address information from the host computer 160 and transmit the address information to each of the programmable logic devices 208a–d. The line of the address lines 420 corresponding to the least significant bit of the address information received from the host computer 160 connects to the port select input of each motion control processor 310a–d.

The programmable logic devices 208a–d decode the address information and output chip select signals to the chip select inputs of the motion control processors 310a–d, respectively for writing and reading data operations. Each motion control processor 310a–d is associated with an address that may be selected by a user via the switches SW3, SW4, SW5, SW2, respectively. The programmable logic devices 208a–d are programmed to process the address received from host computer 160 via the controller interface 202 to determine whether the address corresponds to the address of the corresponding motion control processor 310a–b provided by corresponding switches SW3, SW4, SW5, SW2. Each of the programmable logic devices 208a–d outputs appropriate signals to the chip select input of the corresponding motion processor selecting that processor, if the address received from the host computer 160 via the controller interface 202 corresponds to the address of the corresponding motion control processor. In this way, typically, only one motion processor is selected. However, by providing a programmable logic device U1 and a shift register U8, as shown in FIG. 4, two or more processors may be selected at the same time for coordinated motion. Shift register U8 outputs a corresponding chip select output signal for each of the programmable logic devices 208a–d. These chip select output signals are output by the programmable logic devices 208a–d to the chip select input of the corresponding motion processor. Two or more processors may be selected at the same time for coordinated motion if the shift register U8 outputs two or more appropriate output chip select signals for selecting the corresponding two or more motion control processors. For example, to achieve coordinated motion for the axis represented by control processor 310a and the axis represented by control processor 310c, the shift register U8 may output a low output signal to programmable logic device 208a and 208c, which passes these signals to the chip select input of motion control processors 310a and 310c, thereby selecting the corresponding axes for coordinated motion. The shift register U8 outputs a high output signal to programmable logic device 208b and 208d so that motion control processors 310b and 310d are not selected.

The shift register U8 determines which motion control processors 310a–d to select for coordinated motion based on information received from the host processor via selected ones of the lines of data lines 410, for example, the lines representing the four most significant bits of data information received for the host processor 160. The selected lines of data lines 410 transmit chip select information for the corresponding motion control processor. Accordingly, to achieve coordinated motion for the axis represented by control processor 310a and the axis represented by control processor 310c, for example, the corresponding selected lines of data lines 410 may transmit low output signals to be loaded in the shift register U8 for output to the programmable logic device 208a and 208c at an appropriate time, as determined by programmable logic device U1. The corresponding selected lines of data lines 410 may transmit high output signals to be loaded in the shift register U8 for output to the programmable logic device 208c and 208d at an appropriate time, as determined by programmable logic device U1.

The programmable logic device U1 transmits a signal to shift register U8 causing the signals loaded in the shift register to be output to the corresponding programmable logic devices 208a–d based on the address information provided by SW1 and the address information received from the host computer 160 via address lines 420 and based on an address enable signal provided by the host computer 160 via the controller interface 202. If the address information provided by SW1 equals the address information received from the host computer 160 via address lines 420 and the address enable signal is low, then the programmable logic device outputs a signal to the shift register U8 causing the signals loaded in the shift register to be output to the corresponding programmable logic devices 208a–d. In an alternate embodiment, any other storage device may be used in place of the shift register U8.

The reset line 430 of the controller interface 202 connects to each of the programmable logic devices 208a–d. The reset line 430 receives reset signals from the host computer 160 and transmits the reset signals to each of the programmable logic devices 208a–d. The programmable logic devices 208a–d further receive longpulse input signals LPa–d, respectively, from dual monolithic multivibrators U12 and U21, as shown in FIG. 4. In one embodiment, the dual monolithic multivibrators U12 and U21 correspond to the SN74LS221 dual monolithic multivibrators manufactured by Texas Instruments. A single dual monolithic multivibrator produces two longpulse signals. Accordingly, two dual monolithic multivibrators U12 and U21 may be used to provide the longpulse input signals to the programmable logic devices 208a–d. Based on the longpulse input signals and the reset signals received for the host processor 160 via the reset line 430, the programmable logic devices 208a–d output reset signals to the reset inputs of the motion control processors 310a–d, respectively. In one embodiment, when the longpulse input signal is high (logic 1) and the reset signal is low (logic 0), the reset signal output from the programmable logic device is high (logic 1), resetting the corresponding motion control processor to a predetermined internal condition. If these input conditions are not met, the reset signal output from the programmable logic device is low (logic 1).

The write line 440 of the controller interface 202 connects to the write input of each of the motion control processors 310a–d and the read line 450 of the controller interface 202 connects to the read input of each of the motion control processors 310a–d.

Programmable logic device 208e receives a host interrupt signal from a host interrupt output of each of the motion control processors 310a–d and the information from the data lines 410 of the controller interface 202. The programmable logic device 208e outputs IRQ signals to the controller interface 202 via a switch SW6, which distinguishes the controller 150 from other controllers.

Returning to FIG. 2, the I/O devices 206a–d connect the motion units 110 and corresponding motion control processors 308a–d. The I/O devices 206a–d receive signals from the encoders 130 of corresponding motion units 110 and deliver the signals to the corresponding motion control processors 310a–d. Further, the I/O devices 206a–d output signals from the corresponding motion control processors 310a–d to the amplifiers 140 of the corresponding motion units 110.

Figure 5:
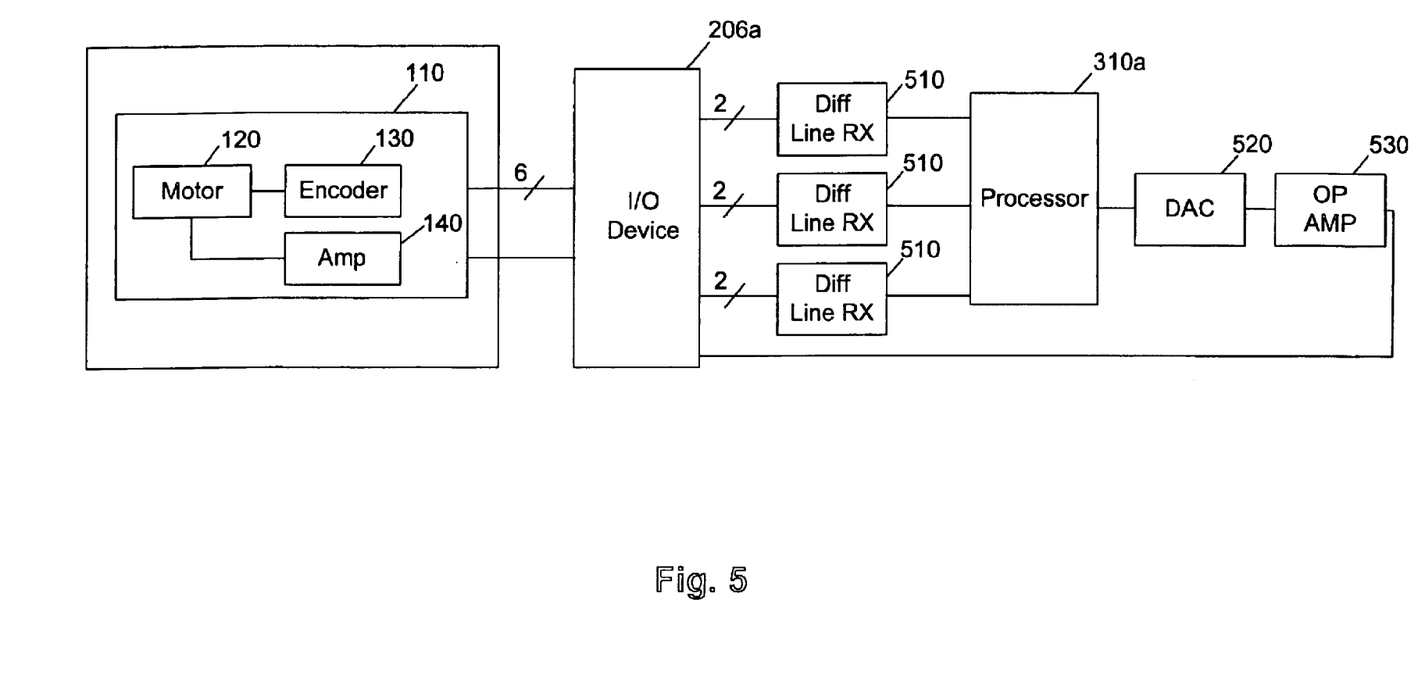
FIG. 5 illustrates a first embodiment of a circuit diagram of a part of the controller of FIG. 2 including an exemplary I/O device and an exemplary corresponding motion control processor connected to an exemplary corresponding motion unit.

FIG. 5 illustrates an exemplary circuit diagram of a part of the controller 150, which includes the I/O device 206a and the corresponding motion control processor 310a. In one embodiment, circuit diagrams for I/O devices 206b–d and the corresponding motion control processors 310b–d, respectively, are similar to the circuit diagram of FIG. 5. As shown in FIG. 5, the I/O device 206a receives signals from the encoder 130 of the corresponding motion unit 110 and delivers the signals to the motion control processor 310a. If the motion control processor 310a corresponds to the LM628 or LM629 motion control processors manufactured by National Semiconductor, the I/O device 206a may deliver the signals from the encoder 130 to pins 1, 2, and 3 of the LM628 or LM629 motion control processor 310. The signals from the I/O device 206a may undergo processing by differential-input line receivers 510 prior to being received by the motion control processor 310a, as shown in FIG. 5. In one embodiment, the differential-input line receivers 510 correspond to the differential-input line receivers of the MC3486 quadruple differential line receivers manufactured by Texas Instruments. The MC3486 quadruple differential line receiver from Texas Instrument comprises four differential-input line receivers. Accordingly, because only three differential-input line receivers of the MC3486 quadruple differential line receivers are used to process signals from the I/O device 206a, the MC3486 quadruple differential line receiver may receive and process signals from at least one of the other I/O devices 206b–d.

Figure 6:
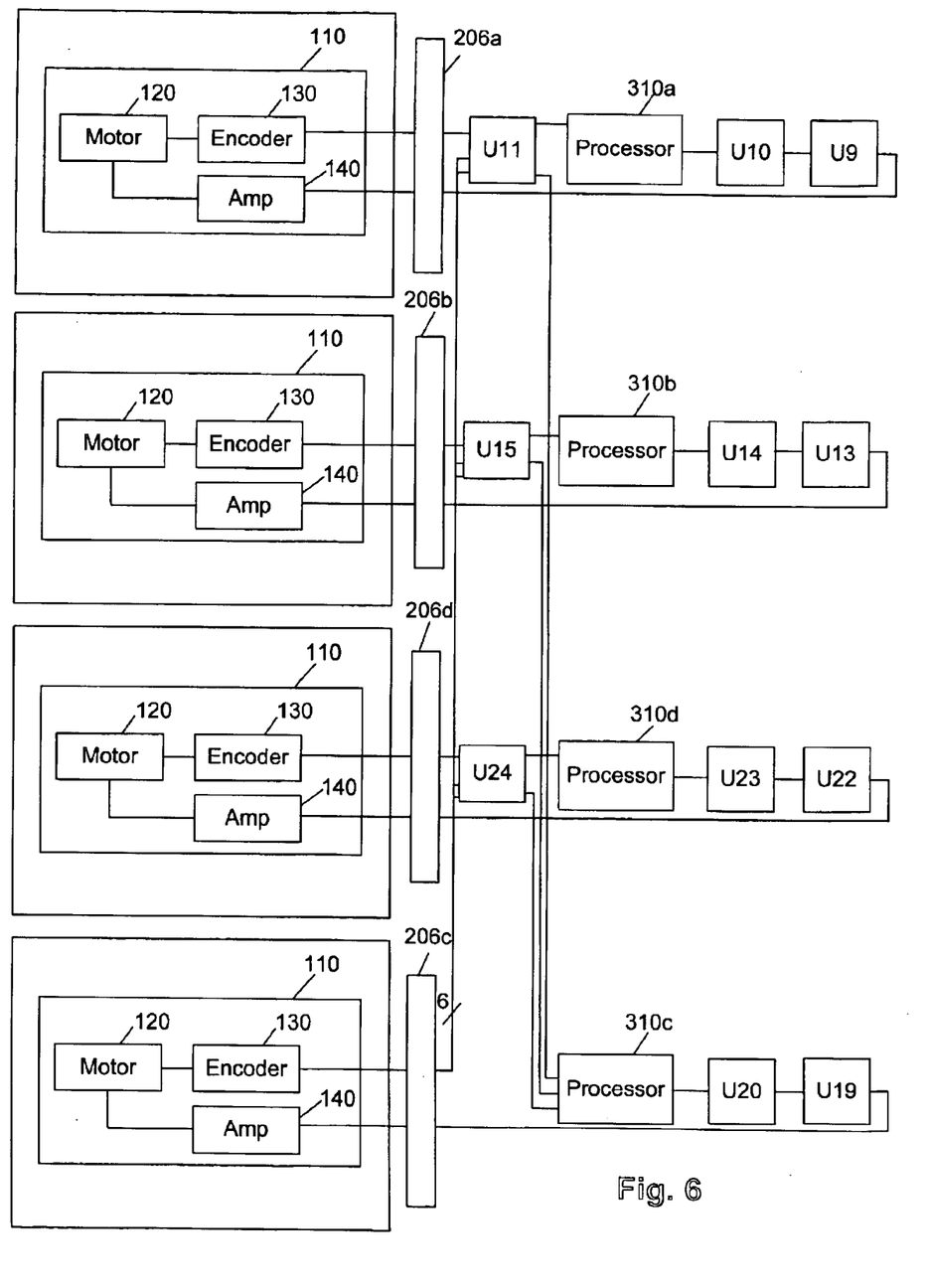
FIG. 6 illustrates a second embodiment of a circuit diagram of a part of the controller of FIG. 2 including multiple I/O devices and exemplary corresponding motion control processors connected to exemplary corresponding motion units.

FIG. 6 illustrates an exemplary circuit diagram of a part of the controller 150 of FIG. 2 for the I/O devices 206a–d and the motion control processors 310a–d when the differential-input line receivers 510 correspond to the differential-input line receivers of the MC3486 quadruple differential line receivers U11, U15, U24 manufactured by Texas Instruments. As shown in FIG. 6, the line receivers U11, U15, U24 receives signals from the I/O device 206c, in addition to signals from I/O device 206a, b, d, respectively.

Further, as illustrated in FIG. 5, the I/O device 206a receives signals from the motion control processor 310a and outputs the signals to the amplifier 140 of the corresponding motion unit 110. As shown in FIG. 5, the signals from the motion control processor 310a may undergo processing prior to being received by the I/O device 206a. For example, if the motion control processor 310a outputs digital signals corresponding to or similar to the output signals of the LM628 motion control processor manufactured by National Semiconductor, the signals output from the motion control processor 310a may be processed by a digital to analog converter 520 and an operational amplifier 530 prior to being received by the I/O device 206a.

FIG. 6 illustrates an exemplary circuit diagram of a part of the controller 150 of FIG. 2 when the motion control processors 310a–d output digital signals corresponding to or similar to the output signals of the LM628 motion control processor manufactured by National Semiconductor. As shown in FIG. 6, the signals from the motion control processors 310a–d are processed by digital to analog converters I/O, U14, U20, and U23, and operational amplifiers U9, U13, U19, and U22, respectively, prior to being received by the I/O devices 206a–d. The digital to analog converters U10, U14, U20, and U23 may correspond to the DAC0800LCM digital to analog converters manufactured by National Semiconductor. The operational amplifiers U9, U13, U19, and U22 may correspond to the UA741CD operation amplifiers manufactured by Philips Semiconductors. If the output of the motion control processors 310a–d correspond to or are similar to the output signal of the LM629 motion control processor manufactured by National Semiconductor, then the output of the motion control processors 310a–d maybe input directly to the I/O device 206a.

The motion controller 150 may further comprise an integrated component for a software language motion program to communicate with the motion control processors 310. The software language motion program may provide a software library that provides a level of abstraction for a software engineer or programmer to facilitate rapid development of motion control software associated with controlling the motors 120 of the motion control system 100 without having to write device level software to communicate with the motion control processors 310 installed on the motion controller 150. The library may provide high level function calls for initialization, PID filter set up, motion control, status reporting, and coordinated motion control. This allows more rapid development of the motion control system. The library may contain the following function prototypes for the LM628 or LM629 motion control processors manufactured by National Semiconductor. However, it will be obvious to those of ordinary skills in the art to change the following library function for other motion control processors:

Initialization
Initialize_LM62X(int address, int dac_12_bit_flag);
Reinitialize_LM62X_Soft_Reset(int address, int dac_12_bit_flag);
Hardware_Reset_LM62X(int address);
Reset(int address);
Define_Home(int address)
PID Filter
KP_Pid_Designate(int address, long int derivative_sampling_interval_us, int kp_data, int fclk_mhz);
KP_Pid_Designate(int address, long int derivative_sampling_interval_us, int ki_data, int fclk_mhz);
KP_Pid_Designate(int address, long int derivative_sampling_interval_us, int kd_data, int fclk_mhz);
IL_Pid_Designate(int address, long int derivative_sampling_interval_us, int il_data, int fclk_mhz);
Motion
Start_Motion(int address)
Acceleration_Relative(int address, unsigned log int accelaration_data_cts_sec_sec, int fclk_mhz)
Acceleration_Absolute(int address, unsigned log int accelaration_data_cts_sec_sec, int fclk_mhz)

Forward_Velocity_Relative_Move(int address, unsigned long int velocity_data_cts_sec, int fclk_mhz)
Reverse_Velocity_Relative_Move(int address, unsigned long int velocity_data_cts_sec, int fclk_mhz)
Position_Relative_Move(int address, unsigned long int velocity_data_cts_sec, int fclk_mhz)
Position_Absolute_Move(int address, unsigned long int velocity_data_cts_sec, long int position_cts, int fclk_mhz)
Stop_Motor_Smoothly(int address,)
Stop_Motor_Abruptly(int address,)
Turn_Off_Motor(int address,)
Interrupt
Record_Index_Position(int address,)
Interrupt_On_Error(int address, unsigned int position_error_threshold)
Stop_On_Error(int address, unsigned int position_error_threshold)
Set_Breakpoint_Absolute(int address, long int position_breakpoint)
Set_Breakpoint_Relative(int address, long int position_breakpoint)
Mask_Interrupts(int address, int breakpoint_irq_on, int position_error_irq_on, int wrap_around_irq_on, int index_pulse_irq_on, int trajectory_complete_irq_on, int command_error_irq_on)
First_Interrupts(int address, int breakpoint_irq_rst, int position_error_irq_rst, int wrap_around_irq_rst, int index_pulse_irq_rst, int trajectory_complete_irq_rst, int command_error_irq_rst)
Reporting
Read_Status_Byte(int address, int *status);
Read_Signals_Register(int address, unsigned int *signals);
Read_Index_Position(int address, long int *index_position)
Read_Desired_Position (int address, long int *desired_position)
Read_Real_Position(int address, long int *real_position)
Read_Desired_Velocity(int address, long int *desired_velocity)
Read_Real_Velocity(int address, long int *real_velocity)
Read_Integration_Sum(int address, unsigned int *integration_sum)
Coordinated Motion
Coordinated_Move_Resgister_Load(int address, int a_motor_select_flag, int b_motor_select_flag, int c_motor_select_flag, int d_motor_select_flag)

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A scalable motion controller for controlling a plurality of servo motors in a motion control system, the scalable motion controller comprising:
   means for inserting and removing one or more motion control processors from the scalable motion controller; and
   means for stacking a plurality of scalable motion controllers.

2. The scalable motion controller of claim 1, wherein the scalable motion controller is PC/104 compliant.

3. The scalable motion controller of claim 1, further comprising means for selecting a plurality of motion control processors for coordinated motion.

4. A motion control system comprising:
   a motion unit wherein the motion unit comprises a motor connected to an encoder and an amplifier; and
   a scalable motion controller connected to the motion unit wherein the scalable motion controller receives first signals from the encoder and outputs second signals to the amplifier,
   wherein the scalable motion controller comprises means for inserting and removing one or more motion control processors from the scalable motion controller.

5. The motion control system of claim 4, wherein the scalable motion controller comprises a plurality of dip sockets arranged for inserting and removing one or more motion control processors.

6. The motion control system of claim 4, wherein the scalable motion controller comprises a connector interface comprising a plurality of male and a plurality of female connectors arranged for stacking a plurality of motion controllers.

7. The motion control system of claim 4, wherein the scalable motion controller comprises means for stacking a plurality of scalable motion controllers.

8. The motion control system of claim 4, wherein the scalable motion controller is PC/104 compliant.

9. The motion control system of claim 4, wherein the scalable motion controller comprises means for selecting a plurality of motion control processors for coordinated motion.

10. The motion control system of claim 4, wherein the scalable motion controller comprises:
    a plurality of programmable logic devices wherein each of the plurality of programmable logic devices provides a chip select signal to a chip select input of a corresponding motion control processor;
    a storage device for storing the chip select signals for each of the plurality of programmable logic devices; and
    a coordinated motion device for causing the storage device to output the chip select signals to the plurality of programmable logic devices at substantially the same time based on a coordinated motion address.

11. The motion control system of claim 10, wherein the storage device is a shift register.

12. A scalable motion controller for controlling a plurality of servo motors in a motion control system, the scalable motion controller comprising:
    a plurality of dip sockets arranged for inserting and removing one or more motion control processors; and
    a connector interface comprising a plurality of male and a plurality of female connectors arranged for stacking a plurality of scalable motion controllers.

13. The scalable motion controller of claim 12, wherein the scalable motion controller is PC/104 compliant.

14. The scalable motion controller of claim 12, further comprising:
    a plurality of programmable logic devices wherein each of the plurality of programmable logic devices provides a chip select signal to a chip select input of a corresponding motion control processor;
    a storage device for storing the chip select signals for each of the plurality of programmable logic devices; and a coordinated motion device for causing the storage device to output the chip select signals to the plurality of programmable logic devices at substantially the same time based on a coordinated motion address.

15. The scalable motion controller of claim 14, wherein the storage device is a shift register.

* * * * *

UNITED STATES PATENT AND TRADEMARK OFFICE
CERTIFICATE OF CORRECTION

PATENT NO. : 6,825,634 B2
DATED : November 30, 2004
INVENTOR(S) : Christopher J. Tatar et al.

It is certified that error appears in the above-identified patent and that said Letters Patent is hereby corrected as shown below:

Title page,
Item [73], Assignee, should be -- Lockheed Martin Corporation -- not "Lockeed Martin Corporation".

Signed and Sealed this

Tenth Day of May, 2005

JON W. DUDAS
*Director of the United States Patent and Trademark Office*